UNITED STATES PATENT OFFICE.

HERMAN HEUSER, OF CHICAGO, ILLINOIS.

MANUFACTURE OF ALCOHOL-REDUCED BEVERAGES.

1,302,552.  Specification of Letters Patent.  Patented May 6, 1919.

No Drawing.  Application filed December 9, 1918.  Serial No. 265,948.

*To all whom it may concern:*

Be it known that I, HERMAN HEUSER, a citizen of the United States, residing at Chicago, in the county of Cook and State of Illinois, have invented certain new and useful Improvements in the Manufacture of Alcohol-Reduced Beverages, of which the following is a specification.

My invention relates to the manufacture of alcohol-reduced hopped beverages made from wort by fermenting the same, and in particular to the manufacture of beverages of this kind which are non-intoxicating, and my invention consists in increasing to the normal extract-percentage of hopped beverages the extract of a fermented wort which contains less unfermented extract than is usually contained in such beverages.

Intoxicating hopped beverages contain during their working-up process at the stage where the wort is fermented, as much alcohol as regular beer. With my invention it is possible to limit the alcohol-production during this stage to any predetermined small amount that is allowed in non-intoxicating beverages without lowering the beer quality and nutritive value of the final product. While this limitation is desirable for the manufacture of such beverages in a territory where the manufacture of regular beer is allowed, it is of special importance in a territory where the manufacture of regular beer is prohibited.

It is impossible in practice to produce by mashing worts of customary gravity in which the amount of fermentable carbohydrates or alcohol-producing substances is so low that the worts will ferment to beverages containing such small amounts of alcohol as are allowed in non-intoxicating hopped beverages. For these reasons in the manufacture of non-intoxicating beverages made from wort by fermenting the same the alcohol-content of the wort during its fermentation approaches fully or about the alcohol-content of regular beer, and if worts of unusually low gravity should be produced by thin-mashing or dilution with water, the fermented worts invariably contain less extract than is contained in such beverages.

With the use of my invention in the manufacture of non-intoxicating beverages the worts can be used in so thin or diluted a condition without lowering the quality of the final product that the alcohol-content of the wort during the fermenting stage will be within the non-intoxicating limit, for instance within one-half (½) of one per cent. (1%) by volume.

To illustrate a practical application of my invention, I take 100 barrels of a 9% wort, the starch-conversion of which has taken place at high temperatures, and which contains 3% of alcohol-producing carbohydrates, corresponding to an alcohol-producing capacity of 1.87% by volume, and further 6% of unfermentable extract. I dilute the wort with 300 barrels of water and thereupon subject the mixture to the usual hopping treatment in the kettle, preferably with only 0.10 to 0.20 of a pound of hops to the barrel of diluted wort. The wort having been diluted four times possesses an alcohol-producing capacity of 0.47% by volume. The hopped mixture is cooled to a desirable fermentation temperature, say about 48° Fahrenheit, and then is pitched with a suitable quantity of yeast, say from one-third (⅓) to two-thirds (⅔) of a pound of thick-fluid yeast per barrel, whereupon it is left to ferment.

When the fermentation has been completed, the wort is clarified in any suitable manner to remove the yeast; this may be done by sedimentation. The wort having been four times diluted, possesses an unfermented extract of 1.50%; an extract-content of only 1.50% is far below the amount of extract of non-intoxicating hopped beverages, and therefore for the purpose of raising the extract I subject the wort to evaporation, preferably by boiling the same under a vacuum and at temperatures which are high enough to sterilize the wort. When the percentage of extract in the evaporating wort has increased to the extract-content of non-intoxicating hopped beverages, say to 4.50%, the concentration of the wort is stopped. The volume reduction involved in the above evaporation is large and requires ordinarily much time, but when accomplished by the apparatus described in my U. S. Patent No. 1,277,931, dated September 3, 1918, it is completed for the entire 400 barrels within a comparatively short time.

Thereupon the concentrated wort is treated in any desirable manner to improve its taste and flavor, before it is carbonated and put upon the market.

It is, of course, immaterial at which particular stage the dilution of the wort with water takes place. Thus it may take place in the fermenting vessel after the pitching of the wort, and if it does take place at this stage the water used for dilution should be sterilized and cooled to about the temperature of the pitched wort before it is added, and the amount of hops used for hopping the undiluated wort in the kettle should be correspondingly larger per barrel than it is for the diluted wort. The hopping is preferably applied to the wort either before or after it is diluted with water, though it may be also applied to the fermented wort, after its percentage of extract has been increased to the desired extent.

In the above illustration of my invention I increase the extract of the fermented wort by evaporating the wort to the extract-percentage of non-intoxicating beer. I may also accomplish such extract-increase by adding to the wort a suitable quantity of a condensed fermented wort in liquid or solid form and thereby obtain the same results, because the addition of the condensed fermented wort produces in the wort the same increase in extract quantitatively as well as qualitatively as the evaporating of the wort does. I add the condensed fermented wort to the wort at any convenient stage of the manufacture; thus I may add it at the kettle and shortly before the boiled wort is cooled to the fermenting temperature.

The added condensed fermented wort may be hopped or unhopped, and when it is used in the unhopped condition the quantiy of hops used for hopping the wort in the kettle should be suitably increased. By carrying out my invention by the addition to the wort of condensed fermented wort, such as a condensed fermeted wort syrup or powder, the same can be utilized also in small plants, which usually lack the proper facilities for evaporating the wort as stated above.

My invention is also applicable to the production of regular beer and more particularly so if the permissible alcohol-limit in the same, now 2.75% by weight, has been still more reduced and to an extent where the amount of extract that can possibly be produced with the reduced amount of alcohol becomes so low that the nutritive value of the beer is at stake, and therefore requires to be increased to the proper extent, but such reduced amount may not however be a non-intoxicating amount. With reference to alcohol-reduced regular beer my invention is preferably practised by the addition of a condensed fermented wort, and if this is done the extract-increased beer does not require elaborate preparation to make it ready for the market, and usually short storing with subsequent carbonating and filtering are sufficient to make the extract-increased beer ready for the market.

The normal unfermented extract in regular beer and in alcohol-reduced beer varies between 3% and 7%, and by my process I increase the unfermented extract in the diluted fermented wort or beer to this normal percentage of extract.

The alcohol-reduced hopped beverages produced by my invention represent a superior product inasmuch as they possess a maximum of characteristic beer properties that is possible of being produced in alcohol-reduced hopped beverages.

I claim:—

1. In the manufacture of alcohol-reduced hopped beverages, the step of increasing to the normal extract-percentage of alcohol-reduced beer the unfermented extract of a wort containing less than the normal unfermented extract in beer.

2. In the manufacture of alcohol-reduced hopped beverages, the step of increasing to the normal extract-percentage of non-intoxicating beer the unfermented extract of a wort containing less than the normal unfermented extract in non-intoxicating beer.

3. In the manufacture of alcohol-reduced hopped beverages, the process which consists in producing wort of unusually low gravity, fermenting the wort, and increasing the extract of the fermented wort to the percentage of unfermented extract contained in fermented hopped beverages.

4. The process which consists in producing wort with a reduced alcohol-producing capacity by dilution with water, fermenting the diluted wort, and evaporating the extract of the fermented diluted wort to the percentage of extract contained in fermented hopped beverages.

In testimony whereof I affix my signature in presence of two witnesses.

HERMAN HEUSER.

Witnesses:
J. McRoberts,
Bernice Gormley.